United States Patent [19]

Marino et al.

[11] 3,908,086

[45] Sept. 23, 1975

[54] METHOD FOR ESTABLISHING A DATA COMMUNICATION CONNECTION BETWEEN TWO FULL DUPLEX MODEMS

[75] Inventors: Francis C. Marino, Dix Hills; Edward Krummenacker, Smithtown, both of N.Y.

[73] Assignee: Redactron Corporation, Hauppauge, N.Y.

[22] Filed: June 3, 1974

[21] Appl. No.: 475,510

[52] U.S. Cl. .............................................. 179/2 DP

[51] Int. Cl.² .......................................... H04M 11/06

[58] Field of Search ......... 179/2 DP, 2 A, 3, 4, 1 C, 179/2 C; 178/58, 66 R

[56] References Cited

UNITED STATES PATENTS

| | | | |
|---|---|---|---|
| 3,769,454 | 10/1973 | Liberman et al. | 179/2 DP |
| 3,842,207 | 10/1974 | Fretwell | 179/2 DP |
| 3,852,531 | 12/1974 | Fretwell et al. | 179/2 DP |

*Primary Examiner*—Kathleen H. Claffy
*Assistant Examiner*—Thomas D'Amico
*Attorney, Agent, or Firm*—Hane, Baxley & Spiecens

[57] ABSTRACT

When two full duplex modems are connected via a telephone network and a call is made from one modem to the other ringing energy causes the application of power to the called modem which is energized to operate randomly in either the originating or answering mode. If the called modem does not detect the receipt of carrier signal from the calling modem within a given time interval, the called modem switches operating modes and again attempts to detect the receipt of carrier signals. Whenever carrier signal is detected the modem locks in the then present mode and data communication can begin.

2 Claims, 1 Drawing Figure

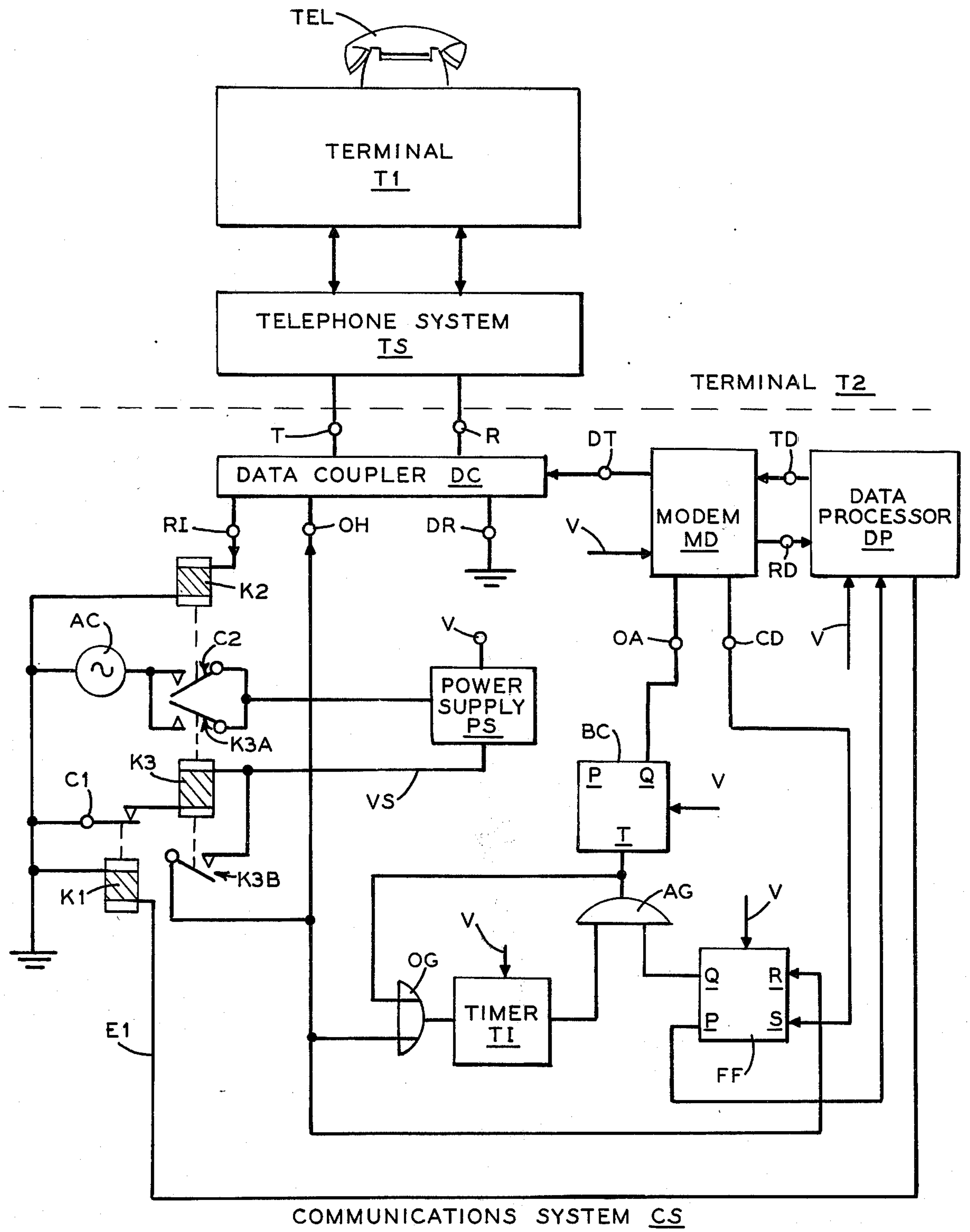
COMMUNICATIONS SYSTEM CS

METHOD FOR ESTABLISHING A DATA COMMUNICATION CONNECTION BETWEEN TWO FULL DUPLEX MODEMS

This invention pertains to data communication via conventional telephone networks and more particularly to the establishment of a data communications connection between two full duplex modems.

In order for any two full duplex modems, such as the Bell 103A-type modem, to establish full duplex communication between them, two different frequency bands are simultaneously used, one carrying data in each direction. Each band contains a single frequency carrier which is shifted to one of two frequencies one representing the MARK state and one the SPACE state. The two frequencies in the lower band F1 are designated F1M and F1S for MARK AND SPACE, respectively. The corresponding frequencies in the higher band, F2 are designated F2M and F2S.

Each modem has two frequency modes, originating and answering. The originating, or calling modem transmits in band F1 and receives in band F2. The answering, or called modem transmits in band F2 and receives in band F1.

Each modem is normally in the originating mode. When a ringing signal indicates the arrival of an incoming call, the called modem switches to the answering mode and remains in it for the duration of the call. If the call is unanswered, the called modem reverts to the originating mode.

Power for the ringing signal is supplied by the telephone company which also powers the telephone handset portion of the modem independent of any local AC power source. The remaining portion of the modem including those circuits required to detect the ringing signal and to establish the correct operating mode, derives its power from the local AC power source.

It should be apparent that with present techniques, the called modem must be powered at the time of an incoming ringing signal in order that it establish the answering mode of operation. If power is applied to the called modem subsequent to answering an incoming call, data communications could not take place since then both the called and the calling modem will be in the originating mode. This follows from the fact that the called modem was unable to detect the incoming ringing signal in the absence of local AC power whereupon it automatically assumes the originating frequency mode when power is finally applied to it.

It is not uncommon for customers of this type of modem to power the modem together with their associated data processing equipment only when such equipment is to be used. This is especially true of customers who employ modems supplied by companies other than the local telephone company, whereupon such modems are usually integrated within the total data processing equipment. Furthermore, the advent of recent interest in energy conservation may soon dictate that data communications equipment be powered only when in use.

It should be noted that part of the receiving function of this type of modem is to detect the carrier frequency transmitted by the alternate modem. A "carrier detect" signal can occur in each of two modems only if both modems are operating in opposite frequency bands, or complementary modes. Thus, if both modems are simultaneously operating in either the answering or originating mode, neither modem will be capable of detecting carrier making data communications impossible.

It is accordingly an object of the invention to provide a method for establishing a data communication connection between two full duplex modems by insuring that the modems operate in complementary modes even when the called modem receives power after receipt of the ringing signal for initiating the connection routine.

Generally the invention contemplates the idea that when power is applied to the called modem, it is arbitrarily forced into either the originating or answering mode and it makes no difference which mode it assumes.

A logical sequence is eventually started which causes the modem to operate in the frequency band dictated by the assumed mode and to detect the carrier frequency in the opposite frequency band. If, after a predetermined length of time, carrier is not detected, it is assumed that the alternate modem is operating in this same frequency band. The procedure is then to simply alter the operating mode which alters its operating frequency band. If a good connection between modems exists, carrier will be detected by both modems since they will then be operating in in complementary frequency bands, and data communications can be effected. If carrier is not detected, after the same predetermined length of time, the choice is either to abort further attempts to establish proper communications channels or to repeat this process until operators intervene.

Other objects, the features and advantages of the invention will be apparent from the following detailed description when read with the accompanying drawing whose sole FIGURE shows a data communications system with which the invention can be utilized.

In the sole FIGURE the data communications system is shown comprising a data terminal T1 connected via a telephone system TS to a data terminal T2. The terminal T1 can be similar to the terminal T2, but could equally well be a Bell 103A Data Set with a dial telephone. The telephone system TS can be the dial network including subscriber lines extending from the exchanges to the terminals.

The terminal T2 comprises: a data coupler DC; a modem MD; a data processor DP; a control unit including relays K1, K2 and K3, a set-reset flip-flop FF, a single stage binary counter BC, AND-circuit AG, OR-circuit OG, and timer T1; and local source of alternating current AC and power supply PS for powering terminal T2. The terminal usually includes a telephone handset. However, such is not required for the description and performance of the invention.

In operation, terminal T1 calls terminal T2 by using, for example, the dial on telephone handset TEL. In response thereto the telephone system rings terminal T2. In response to the ring current data coupler DC transmits a signal from terminal R1 to the coil of relay K2 which responds by closing its contact set C2. The closure of the contact set C2 causes connection of source AC to power supply PS which converts the AC voltage to a DC voltage on terminal V which is the source operating power for terminal T2. In this way terminal T2 is "turned on."

At this point it should be noted that binary counter BC arbitrarily assumes either its on state with a high signal on the line connected to terminal OA of modem MP or its off state which a lower signal on said line. If the signal is high, modem MD is forced into the originating mode. If the signal is low modem MD is forced into the answering mode. In addition, supply PS feeds a signal on line VS which is fed via the coil of relay K3 and normally closed contact set C1 of relay K1 to ground to energize relay K3. When relay K3 is energized its contact set K3A closes providing a parallel or holding connection from source AC to supply PS, and its contact set K3B also closes causing the transmission of a signal to the OH terminal of data coupler DC via OR-circuit OG to the input terminal of timer T1 and to the reset terminal for flip-flop FF. Data coupler DC in response to the signal at terminal OH indicates the "off hook" condition of terminal T2. The telephone system in response thereto completes the telephone connection between terminals T1 and T2.

The pulse at the input of timer T1 triggers it. Timer T1 which can be a "one shot" or the like has the property of emitting a pulse from its output a predetermined period of time after a receipt of a pulse at its input. Furthermore, the pulse at the reset input R, of flip-flop FF forces it to the reset state wherein its Q terminal is high opening AND-circuit AG and its P output is low indicating to data processor DP to remain idle.

Now a time interval such as 2 seconds is permitted to elapse to see whether the terminals T1 and T2 have assumed complementary operating modes (it being presupposed a reliable telecommunications connection has been established between the terminals). If the terminals have assumed complementary modes, then the modem MD of terminal T2 can detect the carrier signal from terminal T1. If the carrier signal is detected, modem MD transmits a signal from terminal CD which is fed to the set terminal of flip-flop FF causing the flip-flop to switch to the set state. In the set state the Q output goes low blocking AND-circuit AG which basically isolates the switching input of binary counter BC thus locking the state of the counter BC and freezing the modem MD into its present operating mode. In addition, the P output of the flip-flop FF goes high, activating the data processor DP. When the terminal T2 is to transmit data it is fed from the data processor DP via the terminal TD, modem MD, terminal DT, data coupler DC and terminals T and R to the subscriber line. When the terminal T2 is to receive data, it is transferred from the subscriber line via terminals T and R, data coupler DC, terminal DT, modem MD and terminal RD to the data processor DP.

Of course it should be realized that data can flow simultaneously in both directions and that there are actual protocols established for the exchange of data. However, since the data processors and the actual data exchanged from no part of the invention they will not be discussed.

Note, however, that if no carrier were detected within the two second interval AND-circuit AG would still be open. Therefore, the pulse emitted by timer T1 at the end of the interval would pass through AND-circuit AG to toggle the counter BC causing the signal level at terminal OA to switch and consequently causing modem MD to switch operating modes. This new operating mode will be the complement of the operating mode of terminal T1 (assuming a reliable telecommunication connection between the terminals). Thus, carrier will be detected by modem MD resulting in the setting of flip-flop FF and the terminal then operates as described above for the steps that occur in response to the setting of the flip-flop.

As insurance, the pulse that toggled the binary counter BC is fed back via OR-circuit OG to again trigger the timer T1 to set up another two second interval just in case by some transient the terminals are still not in complementary modes.

Finally, at the end of the data transfer the data processor transmits a signal on line E1 to energize relay K1 which responds by opening its contacts C1. Consequently, relay K3 is deenergized causing its contacts K3A to open disconnecting source AC from power supply PS and terminal T2 shuts down.

The data coupler DC is a standard off the shelf component which is described in Bell System Data Communication TECHNICAL REFERENCE entitled "DATA COUPLER CBS and CBT for Automatic Terminals", Copyright 1970 by the American Telephone and Telepgraph Co. 1970. See especially FIG. 3*a* on page 2.

The modem is also an off the shelf item which is supplied by many manufacturers. For example, the modem can be an OEM Data Set Series VA300 comprising a transmitter module and a receiver module supplied by the VADIC Corporation of Palo Alto, Calif. and described in their Data Sheet 7113 dated April 1971.

It should be noted that it is not possible for both modems to alternate modes at the same time since:

a. the waiting period of both modems are factory-set to be approximately the same, and
b. it is required procedure in manual operations for one modem to start its channel establishment sequence before the other; or
c. in automatic operations, the calling modem starts it channel establishment sequence upon receipt of a unique "answer" tone (2025 hz) from the called modem. Thus, the channel establishment sequence of the calling modem always precedes that of the called modem in automatic operations.

Reference to the Bell System "Data Set 103A Interface Specifications," dated February 1967 will show that modems employing the method of channel or mode establishment disclosed here are also perfectly compatible with the popular Bell 103A modem, which does not employ this method and which, by itself, is not independent of the power turn-on sequence. However, when connected to a modem possessing the logical method disclosed herein, even the Bell 103A becomes independent of the power turn-on sequence.

What is claimed is:

1. In a data communication system wherein at least a pair of full duplex modems are connected together by a telecommunication system to communicate through the transfer of frequency shift keyed carrier signals and wherein at least one of the modems is initially unpowered, a method of establishing a data communications connection between the modems by forcing the condition that one of the modems operates in an originating operating mode with a first frequency band and the other modem operates in an answering operating mode with a second frequency band, said method comprising the steps of a first of the modems in one of the operating modes calling a second of the modems, the second modem being unpowered, applying power to the second modem in response to the call of the first modem, forcing the second modem into an arbitrary one of the operating modes, the first modem transmitting carrier signals in the frequency band associated with its present operating mode, the second modem sensing for the receipt of such carrier signals from the first modem, if such carrier signals are sensed within a predetermined time activating data transfer routines between the two modems, if such carrier signals are not sensed within the predetermined time forcing the second modem to switch to the other operating mode and to again sense for the receipt of such carrier signals, and when such carrier signals are then sensed by the second modem activating the data transfer routines.

2. The method of claim 1 wherein the second modem is turned on in response to a ringing signal from the first modem.

* * * * *